(12) United States Patent
Falk et al.

(10) Patent No.: US 11,461,160 B2
(45) Date of Patent: Oct. 4, 2022

(54) METHOD AND APPARATUS FOR REACTION-FREE AND INTEGRITY-PROTECTED SYNCHRONIZATION OF LOG DATA

(71) Applicant: Siemens Mobility GmbH, Bayern (DE)

(72) Inventors: Rainer Falk, Poing (DE); Matthias Seifert, Buchholz (DE); Martin Wimmer, Neubiberg (DE)

(73) Assignee: SIEMENS MOBILITY GMBH

( * ) Notice: Subject to any disclaimer, the term of this patent is extended or adjusted under 35 U.S.C. 154(b) by 188 days.

(21) Appl. No.: 16/755,999

(22) PCT Filed: Sep. 27, 2018

(86) PCT No.: PCT/EP2018/076239
§ 371 (c)(1),
(2) Date: Apr. 14, 2020

(87) PCT Pub. No.: WO2019/076600
PCT Pub. Date: Apr. 25, 2019

(65) Prior Publication Data
US 2021/0365313 A1 Nov. 25, 2021

(30) Foreign Application Priority Data
Oct. 17, 2017 (DE) ...................... 10 2017 218 531.7

(51) Int. Cl.
*G06F 11/00* (2006.01)
*G06F 11/07* (2006.01)
(Continued)

(52) U.S. Cl.
CPC ...... *G06F 11/0784* (2013.01); *G06F 11/0775* (2013.01); *G06F 11/0787* (2013.01);
(Continued)

(58) Field of Classification Search
CPC ............ G06F 11/0784; G06F 11/0775; G06F 11/0787; G06F 11/3075; G06F 11/3086;
(Continued)

(56) References Cited

U.S. PATENT DOCUMENTS 8,250,235 B2 * 8/2012 Harvey ................. H04L 63/105
709/237
9,507,798 B1 11/2016 Zhao et al.
(Continued)

OTHER PUBLICATIONS

PCT International Search Report and Written Opinion of International Searching Authority dated Dec. 11, 2018 corresponding to PCT International Application No. PCT/EP2018/076239 filed Sep. 27, 2018.

*Primary Examiner* — Joseph D Manoskey
(74) *Attorney, Agent, or Firm* — Schmeiser, Olsen & Watts LLP

(57) ABSTRACT

A method and a device for a reaction-free and integrity-protected synchronization of log data between at least one first network and a second network is provided. The log data is copied by means of a monitoring device upon being transmitted from devices to a first log server in the first network. Metadata of the log data is additionally generated in a first managing unit, the metadata including time information, integrity information, origin information, and/or completeness information. The copied log data and the corresponding metadata are transmitted to the second network via a unidirectional coupling unit in a reaction-free manner. The lot data is checked and ordered chronologically in the second network using the metadata. Thus, a synchronized copy of the log data from the first network is promptly provided in the second network.

14 Claims, 4 Drawing Sheets

(51) Int. Cl.
*G06F 11/30* (2006.01)
*H04L 41/069* (2022.01)

(52) U.S. Cl.
CPC ...... *G06F 11/3075* (2013.01); *G06F 11/3086* (2013.01); *H04L 41/069* (2013.01)

(58) Field of Classification Search
CPC ............. G06F 11/0766; G06F 11/1004; G06F 11/3003; G06F 11/3006; G06F 11/3079; H04L 41/069
See application file for complete search history.

(56) References Cited

U.S. PATENT DOCUMENTS

| | | | |
|---|---|---|---|
| 9,575,987 B2 | 2/2017 | Mraz et al. | |
| 10,445,311 B1 * | 10/2019 | Saurabh | G06F 16/2365 |
| 2006/0218273 A1 * | 9/2006 | Melvin | H04L 63/102 |
| | | | 709/224 |
| 2011/0246826 A1 * | 10/2011 | Hsieh | H04L 41/046 |
| | | | 714/20 |
| 2017/0171220 A1 * | 6/2017 | Thomson | H04L 63/20 |
| 2021/0149909 A1 * | 5/2021 | Diaz | H04L 63/1416 |

\* cited by examiner

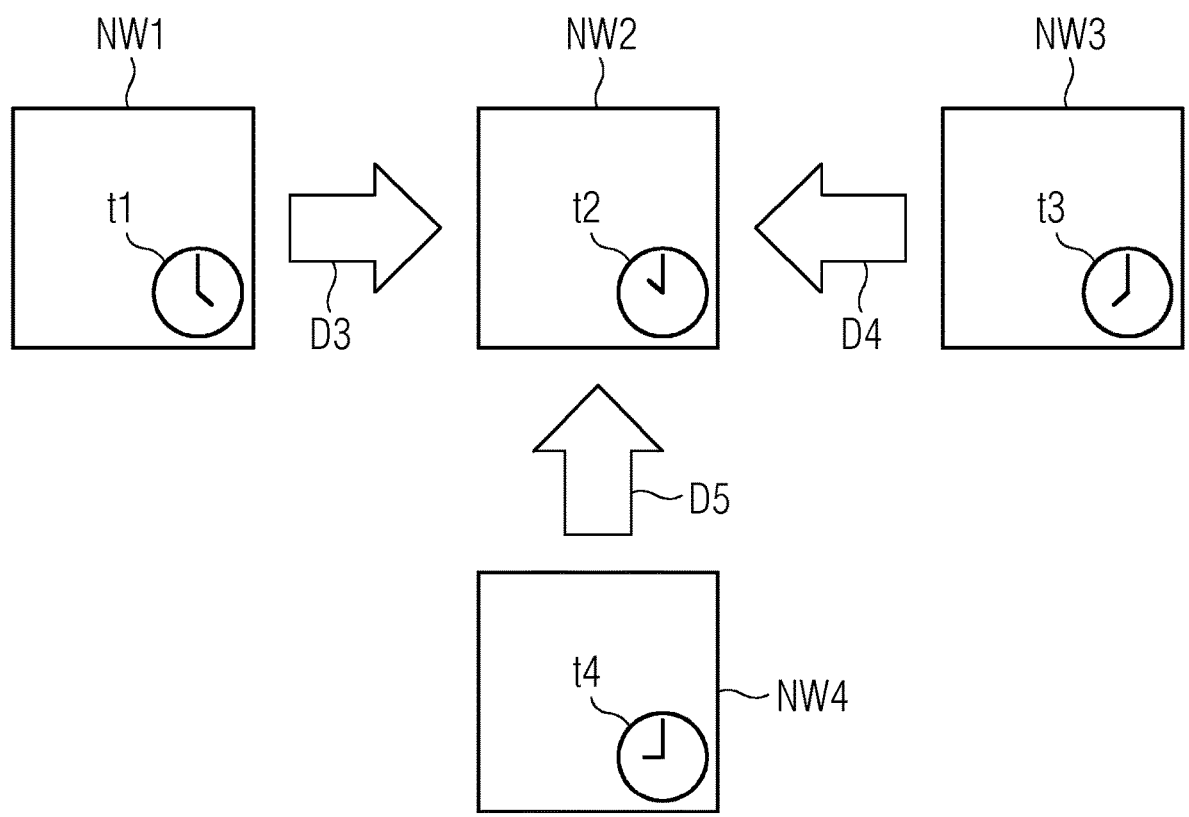

METHOD AND APPARATUS FOR REACTION-FREE AND INTEGRITY-PROTECTED SYNCHRONIZATION OF LOG DATA

CROSS-REFERENCE TO RELATED APPLICATIONS

This application claims priority to PCT Application No. PCT/EP2018/076239, having a filing date of Sep. 27, 2018, which is based off of DE Application No. 10 2017 218 531.7, having a filing date of Oct. 17, 2017, the entire contents both of which are hereby incorporated by reference.

FIELD OF TECHNOLOGY

The following relates to a method and an apparatus for reaction-free and integrity-protected synchronization of log data between at least one first network and a second network.

BACKGROUND

Status monitoring or remote analysis for devices in control networks, such as for example in large industrial installations or in rail networks, is usually performed on the basis of log data of the devices to be monitored. To this end, it is practical to collect the log data for the analysis centrally on a log server, to store them if need be and to forward them for analysis. The collection and analysis can take place either centrally in the respective network or in an external network. In the case of security-critical networks, it is often appropriate to analyze the log data externally, since there is only limited network access. Introducing current software or hardware into the security-critical network can frequently be very complex. Additionally, freedom from reaction needs to be observed, i.e. the introduction of data into the security-critical network is strictly regulated or prohibited so as not to threaten the integrity and security of the network.

The following initial situation thus arises for the analysis of log data from a network having a high security requirement. The devices of a system usually convey log data to a log server connected to the network. The log data can comprise information about actions, process steps, system states or changes in this information. Further instances of application are e.g. the monitoring of a system, error analysis or optimized maintenance management. The log data from a network having a high security requirement are transmitted to a second network for diagnosis or analysis. This second network may be open or may have a lower security requirement. This gives rise to particular conditions for the extraction of the log data from the security-critical network. Coupling the networks via a filtering firewall or via a virtual private network, also called VPN for short, does not satisfy the condition of freedom from reaction. What are known as data diodes are an alternative in this case since they allow unidirectional communication, but they are complex and expensive. Data diodes are normally used for transmitting confidential information. However, they prevent feedback in the event of error messages.

Cloud solutions can be used for the external and central storage and collection of log data. They allow management of log data to be achieved centrally. The transmission of the data to the cloud can also be effected in reaction-free fashion via a data diode, for example. However, this often requires the data to be converted into a cloud-compatible format in the network first and stored. In addition, collection of the data requires an additional component to be introduced into the network and configured, this often being linked to great technical complexity in security-critical networks in order to comply with the requisite security standards.

Furthermore, the evaluation of log data from one or more networks having different devices requires time synchronization in order for example to be able to put the chronological sequence of processes of different devices into the correct order and to relate them to one another and monitor them. Time synchronization between different, mutually independent data networks does not always exist, however. Rarely are the internal clocks of different systems synchronized to a common time, e.g. by means of a GPS receiver.

Additionally, the system times of individual devices within a network can be asynchronous on account of a lack of synchronization of the system times, an intentional time offset or different time formats or time zones. For example, different devices can have log messages having timestamps in different time formats, or their system time can be indicated in different time zones, that is to say not necessarily in coordinated universal time. If log data having different timestamps are collected centrally without synchronization taking place, analysis in the correct order is not possible.

U.S. Pat. No. 9,575,987B2 describes a system for copying information from a network from a reference database to an external database in a second network via a one-way data transmission unit. In order to align the two databases, an update file is created in the first network and is received in the second network. This update file is a file of the database itself, in which changes in the database are recorded. The remote database is updated in accordance with the update information. All of the reference database is therefore mirrored into the second network and subsequent changes are reconstructed using the update file. The synchronization of the databases is therefore file-based, i.e. the individual changes are initially written to the update file, which is subsequently conveyed to a second network and read again. This results in a measurable, non-negligible time offset, which is a problem for an immediate analysis or reaction to log events. Writing and reading files also carries the risk of access conflicts arising if e.g. log changes are detected on the basis of file changes. Furthermore, no time synchronization takes place between the system times of the first and second networks. As such, it is not possible to correctly relate the timings of log events and other log events, for example from other networks, in a reliable manner.

SUMMARY

An aspect relates to provide a simple and inexpensive way of conveying log data from a network having a high security requirement to a second network without a time offset and in reaction-free fashion and in so doing to ensure the chronological order of the log events of different devices and to check the integrity and completeness of the copied log data.

The method according to embodiments of the invention for reaction-free and integrity-protected synchronization of log data between at least one first network and a second network has the following method steps:

log data are monitored and copied in the first network.
metadata of the log data are formed during the monitoring.
the copied log data and the associated metadata are temporarily stored in the first network.

the copied log data and the associated metadata are transmitted from the first network to the second network via a unidirectional coupling unit in reaction-free fashion.

the copied log data are checked and chronologically organized in the second network on the basis of the metadata.

This method can be used to easily and inexpensively transmit log data from at least one network to a second network and synchronize them. The first network can have a high security requirement and the second network can have a lower security requirement. For example, the first network can be a security-critical network and the second network can be a diagnosis network. The unidirectional coupling unit, which permits a data stream only from the first to the second network, ensures that no inadmissible data traffic enters the security-critical network.

The log data, i.e. the monitored data and the associated metadata, are synchronized between the networks, i.e. they are transmitted to a second network. The metadata are used to put the log data into the correct chronological order. If the association of timings for the copied log data and hence a possible dependency of the log data on one another in the second network matches the configuration in the first network, monitoring or analysis can be performed promptly.

Every copied log message is assigned a metamessage. The metadata form the basis for the synchronization of the log data in the second network. The metadata transmitted to the second network together with the copy of the log data can be used to determine the correct order of said log data and hence possible dependencies of the log data on one another. Embodiments of the present invention merely require a log server to be operated in the first network, which log server captures the log data. Such a configuration is usually already present in control networks, which means that embodiments of this invention can be based thereon.

The method involves the metadata therefore being used to produce a data format, formed according to embodiments of the invention, that describes the log data sufficiently to perform a synchronization in a second network following a transmission of the log data thereto.

In one advantageous embodiment of the method, the metadata comprise at least one of the pieces of information from time information, integrity information, origin information and completeness information.

The metadata are formed during the monitoring and copying of the log data sent from the devices to the first log server. They comprise the necessary information about the log data and therefore permit the synchronization and checking thereof in the second network. The time information, for example the time of a log event, can be used to effect correct association of timings in the second network. The information is stored in a data format formed according to embodiments of the invention. The metadata allow the origin and completeness of the transmitted log data to be checked in the second network. As such, information about the respective device that has sent the log data and the volume, e.g. the size, of the log data themselves can be stored in the metadata.

In a further advantageous embodiment of the method, changes in the log data and/or in the associated metadata in comparison with the previously sent log data and metadata are detected in the first network continuously and just the changes are transmitted to the second network This embodiment ensures efficient synchronization of the log data. When the log data is first transmitted to the second network, all of the data, i.e. the log data and the associated metadata, are synchronized. In the event of subsequent changes, only the accordingly changed log data and metadata are forwarded in the first network. This has the advantage that the synchronization can be performed even more quickly, and promptly. The detection of changes in the log data and/or metadata in comparison with the previous data inventory proceeds continuously, so that updates can be found immediately. As soon as they are detected, these can immediately be transmitted to the second network, so that a current copy of the log data is available in the second network promptly.

It is furthermore possible for all of the data record to be transmitted again in the course of operation too. This can take place e.g. at the request of a user, or it can take place automatically when there is a prescribable criterion. As such, for example all of the log data and metadata can be transmitted at regular intervals, e.g. daily or monthly. This has the advantage that even if individual change data have been lost during transmission thereof or if transmission errors have occurred, a complete data record can be formed again.

In a further advantageous embodiment of the method, the checked and chronologically organized copy of the log data is temporarily stored in the second network.

The log data copied to the second network are initially checked and synchronized on the basis of the metadata. Subsequently, they are temporarily stored, i.e. buffered, in the second network. These buffered log data are then an identical, time-synchronized copy of the log data inventory in the first network, which can then be forwarded e.g. for evaluation. The local buffering in the second network additionally has the advantage that repeat transfers of log events can be detected and handled. Additionally, this permits a repetition of the synchronization if for example log data in the second network are erroneous or completely absent.

In a further advantageous embodiment of the method, the checked and chronologically organized copy of the log data is forwarded in the second network to a second log server.

An identical, time-synchronized copy of the original log data inventory is available in the second log server. A subsequent analysis or archiving of the log data can take place there. This copy can be updated promptly after every detected change. Every evaluation or further analysis of the log data can be performed using this identical copy without having to take direct action in the first network. This firstly ensures the required freedom from reaction in security-critical first networks and secondly permits e.g. evaluation using the latest software, which can simply be introduced into the second network.

In a further advantageous embodiment of the method, a cryptographic checksum for the copied log data and/or the metadata is created in the first network and is transmitted to the second network with the log data and metadata.

A cryptographic checksum created for the copied log data and/or metadata in the first network can be used to check whether the transmitted data record matches the original log data record from the first network and comes from a known forwarding unit in the first network. The cryptographic checksum can be a digital signature, a hash value or a message authentication code, for example.

In a further advantageous embodiment of the method, the time information in the metadata comprises a serial log identification number and/or a timestamp for the time at which the log data are copied and/or a timestamp for the time at which the copied log data are transmitted to the second network.

The time information in the metadata can be used to trace back the chronological order of the individually transmitted log events. If log data come from different systems having different system times, the timestamps can be used to put the log data into the correct chronological order.

In a further advantageous embodiment of the method, the time information in the metadata is formed independently of a system time of a device in the first network.

The method complements the log data with a timestamp that is independent of the respective system time of the device. This timestamp is therefore universal. As such, although a log message can contain time information that the device has created in a specific format and time zone, said time information does not have to be explicit. The method results in time information being written to the associated metamessage that permits an explicit association of timings with respect to all other log events from different devices in the network. This facilitates the synchronization of events of a network. Furthermore, it is possible for the time information in the metadata to be formed independently of a system time synchronized between the devices of the first network.

In a further advantageous embodiment of the method, the log data have their timings matched between at least one first network and a second network independently of the specific network times of the individual networks.

The time information in the metadata, which are independent of the system times of the devices in a network, can be used to explicitly associate the timings of the log events. This has the advantage that a device or all of a network does not have to be changed to a common time, such as for example as a result of the installation of a GPS receiver.

If multiple networks are interfaced with the second network using this method, the log events of said networks can also be associated with one another and put into chronological order on the basis of the timestamps.

In a further advantageous embodiment of the method, a signal is transferred to the first network and, on the basis of the signal, the log data and/or the associated metadata are partially or completely transmitted from the first network to the second network again if the transmitted log data and/or metadata in the second network are incomplete.

This has the advantage that erroneous or absent log data and/or metadata in the second network are re-requested and can thereby be complemented or completed promptly.

The apparatus according to embodiments of the invention for reaction-free and integrity-protected synchronization of log data between at least one first network and a second network comprises a first management unit, a unidirectional coupling unit and a receiving unit. The first management unit is designed to monitor and copy log data in the at least one first network, to form metadata of the log data during the monitoring and to temporarily store the log data and metadata. The unidirectional coupling unit is designed to transmit the copied log data and the associated metadata from the first network to the second network in reaction-free fashion. The receiving unit in the second network is designed to check and associate the timings of the copied log data on the basis of the metadata.

The apparatus according to embodiments of the invention processes the log data in reaction-free fashion and can therefore be used for coupling security-critical networks to an open diagnosis network without additional certification or validation. There merely needs to be a log server present in the network to be monitored, to which devices in this network convey log data. A monitoring apparatus is used to monitor and copy these data. The monitoring of the log data in the first network takes place in parallel with other processes and does not interfere with them. It is not necessary for synchronized time information to be available in the first network.

Further advantages of the apparatus are equivalent to the advantages of the method according to embodiments of the invention.

A further aspect of embodiments of the invention relates to an apparatus comprising a forwarding unit in the first network that is designed to continuously detect changes in the log data and/or in the associated metadata in comparison with the previously sent log data and metadata and to transmit just the changes to the second network.

The forwarding unit monitors whether there are changes in the log data inventory in the first management unit in the first network. Consequently, only changes in the log data and/or metadata are transmitted to the second network, making the transmission faster and hence the method more efficient.

Additionally, the apparatus can be used for the realtime analysis of log data, since the transmission to a second network, possibly after every log change, takes place without buffer storage to e.g. a log file.

In a further advantageous embodiment, the apparatus according to embodiments of the invention comprises a second management unit in the second network that is designed to temporarily store the copied log data.

It is appropriate to temporarily store the log data in the second network in order to detect repeat synchronization processes, for example. The checked and synchronized log events can be forwarded from the management unit to a second log server for analysis or archiving.

In a further advantageous embodiment, the apparatus according to embodiments of the invention comprises at least one return channel from the receiving unit in the second network to the forwarding unit in the first network that is designed to convey a signal to the first network, wherein, on the basis of the signal, the log data and/or the associated metadata are partially or completely transmitted from the first network to the second network again if the transmitted log data and/or metadata in the second network are incomplete.

This variant embodiment of the apparatus according to embodiments of the invention allows a simple and fast way of repeating the process of synchronization if log data in the second network are absent or erroneous. The apparatus according to embodiments of the invention does not adversely influence a closed information loop that ensures the requisite freedom from reaction in security-critical networks. The closed information loop is formed by the monitoring apparatus, the unidirectional coupling unit, the receiving unit in the second network and the return channel. The integrity and completeness information in the metadata that is provided in the first network according to the method allows a check to be performed in the second network for every log data record in order to determine whether transmission is erroneous or incomplete.

A further aspect of embodiments of the invention relates to a computer program product, comprising program code portions suitable for performing the steps of the method.

BRIEF DESCRIPTION

Some of the embodiments will be described in detail, with reference to the following figures, wherein like designations denote like members, wherein:

FIG. 4 shows a schematic depiction of the time synchronization of multiple, independent networks by means of the apparatus according to the invention.

Mutually corresponding parts are provided with the same reference signs throughout the figures.

DETAILED DESCRIPTION

Figure 1:
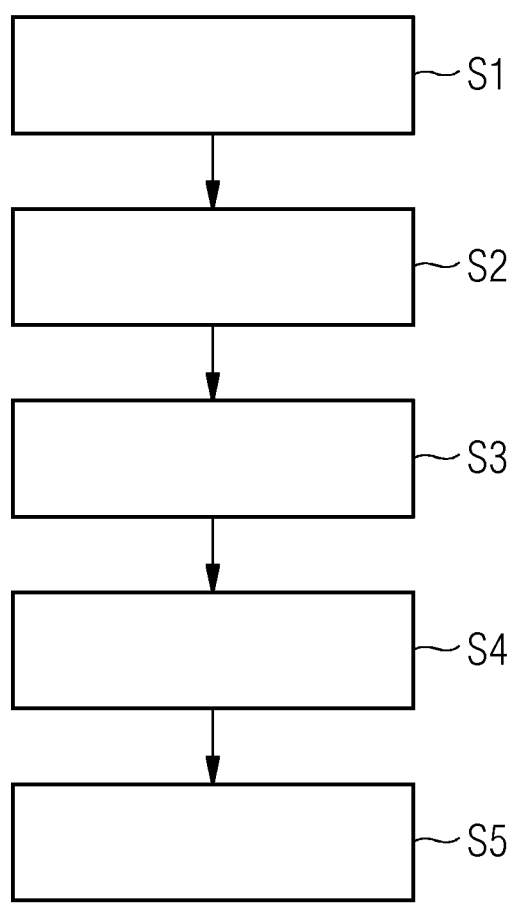
FIG. 1 shows a flowchart for the method according to the invention for reaction-free and integrity-protected synchronization of log data between at least two separate networks.
Figure 2:
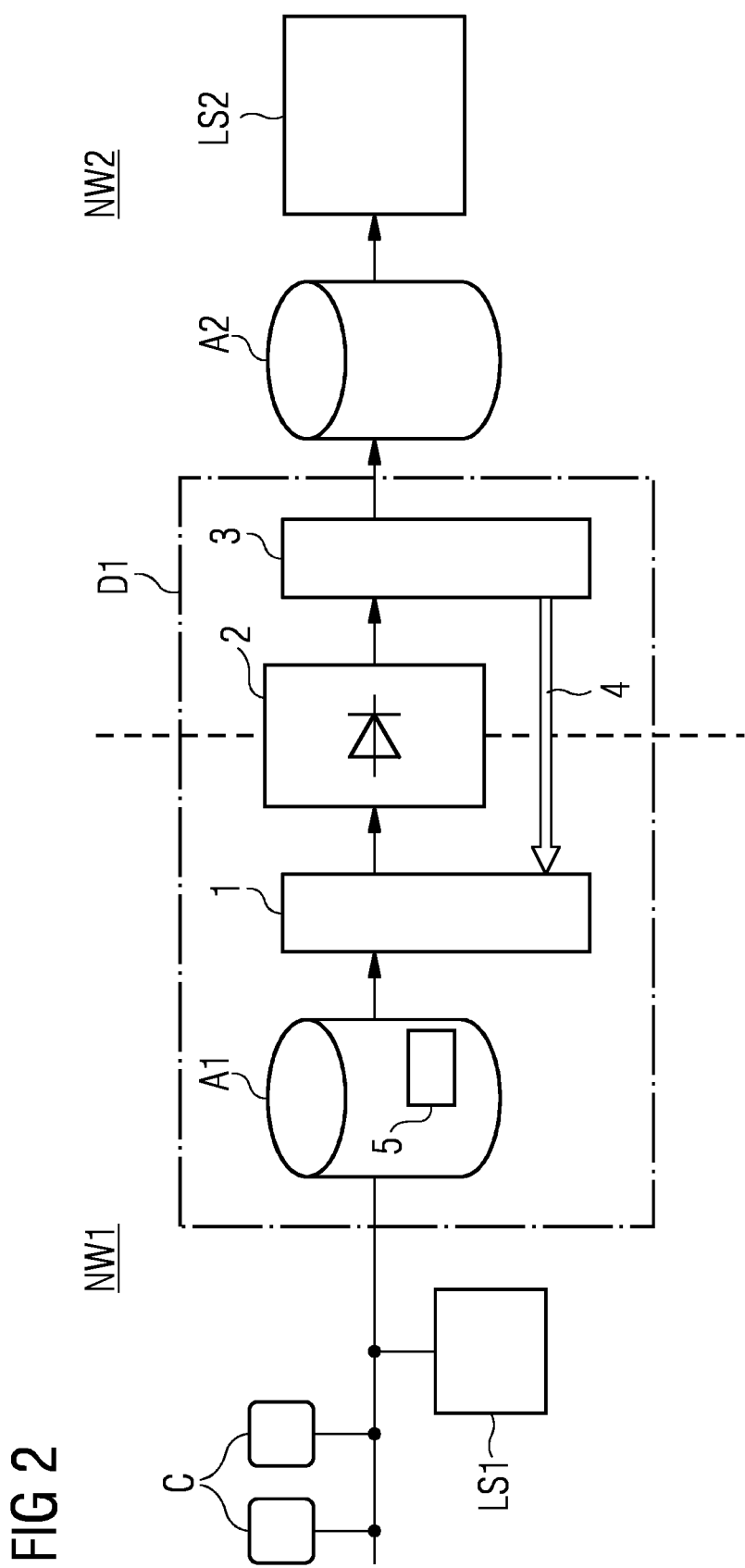
FIG. 2 shows a schematic depiction of an exemplary embodiment of the apparatus according to the invention for reaction-free and integrity-protected synchronization of log data between two separate networks.

FIG. 1 shows a flowchart for the method according to embodiments of the invention for reaction-free and integrity-protected synchronization of log data between at least two mutually separate networks, as depicted in exemplary fashion in FIG. 2. The log data and information from devices C of at least one first network NW1 are conveyed to a native log server LS1 and collected centrally there.

Embodiments of the invention described can be based on the presence of such a log server LS1. In the first step S1 of the method, a monitoring apparatus 5 or what is known as a network tap of a first management device A1 is used to monitor and copy the log data from devices C. The monitoring apparatus can advantageously be configured such that it monitors the conveyance of the log data between devices C and log server LS1. Further configurations of the monitoring apparatus are likewise possible in order to copy log data in the first network promptly. The monitoring apparatus does not take action in the network and therefore does not interfere with processes therein running in parallel. The first management unit A1 can be formed by one or more physical components, e.g. processors. The first management unit A1 can therefore be operated in parallel with processes in the first network NW1, which means that the integrity of the network is protected.

Advantageously, the log data can be monitored and transmitted individually, i.e. without writing them to a log file. The writing and subsequent reading of log files would lead to a time offset and would additionally hamper correct association of timings for log events. This means that this method has the advantage over the conventional art that log data can be mirrored into the second network promptly and a realtime analysis is possible.

In the second step S2, metadata of the log data are created in a first management unit A1 in parallel with the monitoring of the log data.

The copied log data and associated metadata are temporarily stored in the first management unit A1 in the first network. This has the advantage that the synchronization can be performed or repeated at a later time. The log data are also available on the first log server in the first network, but there is usually no additional information there about e.g. dependencies or different time formats of the log data. The first log server LS1 in the first network NW1 merely receives the log data from the devices C. The metadata comprise additional information about the log data and are formed in the first management unit A1 during the monitoring. The metadata comprise time information, integrity information, origin information and completeness information and form the necessary synchronization information for synchronizing the log data in the second network NW2.

A forwarding unit 1 in the first network NW1 can be used to check whether there is a change in the log data inventory. Accordingly, just the changed log data and associated metadata are then forwarded.

In order to ensure freedom from reaction between at least one security-critical network and an open diagnosis network, for example, the next step S3 involves the copy of the log data and their metadata being transmitted to the second network NW2 via a unidirectional coupling unit 2. This ensures the requisite freedom from reaction for the coupling of security-critical networks, since it is thus not possible for an inadmissible data stream to be introduced into the security-critical network.

In the second network NW2, the next step S4 involves the completeness, integrity and origin of the log data being checked before said log data are synchronized on the basis of the metadata in a receiving unit 3 in the diagnosis network NW2 in the next method step S5. Advantageously, the organized and copied log data can subsequently be buffered in a second management unit A2 in the second network NW2.

The prompt mirroring of the log data in the second network NW2 allows the method also to be used for a time-critical analysis of log data in an external network. Additionally, the method can be extended to multiple networks. This advantageously ensures that copies of log data from different networks can be combined in a central network and at the same time the chronological order of the log data from different networks is also retained among one another.

FIG. 2 now schematically depicts an apparatus D1 for synchronizing log data between two mutually separate networks. Embodiments of the invention are not limited to the coupling of only two networks, but rather it is also possible for multiple networks to be coupled to one another in this way and for their log data inventory to be synchronized.

In the depiction shown in FIG. 2, log data from devices C are conveyed to a first log server LS1 in the first network NW1, for example a control network. This conveyance is monitored and copied by a first management unit A1. A monitoring apparatus 5 can for example be configured such that it monitors the communication between the devices C and the log server LS1 in the first network NW1. The monitoring apparatus 5 can, as shown in FIG. 2, be part of the management unit A1. In addition, metadata for the log data are produced in the first management unit A1 in parallel with the monitoring, said metadata being necessary for the synchronization. The forwarding unit 1 detects changes in the log data and/or in the associated metadata and forwards just these changes to the second network NW2. The log data are forwarded individually and not buffer-stored or converted to a different format.

The log data are monitored in the first network NW1 when they are transmitted in the first network NW1. Transmission is effected from a device of the first network NW1 to a log server LS1 of the first network NW1. The metadata are formed by a monitoring apparatus 5 during the monitoring. The metadata can in particular indicate the time of monitoring, i.e. a timestamp formed during the monitoring. They can indicate the monitoring apparatus 5, i.e. identification information such as device type, firmware version and/or serial number of the monitoring apparatus 5. They can indicate the location in the network at which monitoring takes place or at which the monitoring apparatus 5 is located. The metadata can furthermore comprise a checksum for the monitored data and/or for further metadata. The checksum can be e.g. a CRC checksum or a cryptographic checksum, e.g. a cryptographic hash value, a message authentication code or a digital signature.

In contrast to file-based transmission, this method does not necessitate waiting until a file containing the changes has been written. This means that this method is more efficient and allows a fast reaction to log changes. Forwarding of the log data to the second network NW2 can furthermore be effected by the forwarding unit 1 directly, and access conflicts in concurrent processes are avoided. Additionally, the log data and/or the metadata can be provided with a cryptographic checksum in the forwarding unit 1, said cryptographic checksum being able to be used to perform an integrity and authentication check for the log data and/or metadata in the second network NW2.

A unidirectional coupling unit 2 is used to transmit the data to the second network NW2. The unidirectional coupling unit 2 operates in reaction-free fashion and thus prevents inadmissible data traffic from entering the first network NW1. In the second network NW2, the copy of the log data is checked in a receiving unit 3 on the basis of the metadata and put into chronological order and made dependent on one another. In the receiving unit 3, the authenticity of the log data obtained can furthermore be checked on the basis of the cryptographic checksum, and the integrity of the transferred log data can be verified.

The copied and organized log data can subsequently, following a successful check, be conveyed to a second management unit A2 in the second network NW2 and buffered therein. From there, the log data, which are now in an identical and synchronous form in accordance with the original log data in the first network NW1, can be forwarded to a second log server LS2. There, an evaluation of the log data or archiving can take place.

Figure 3:
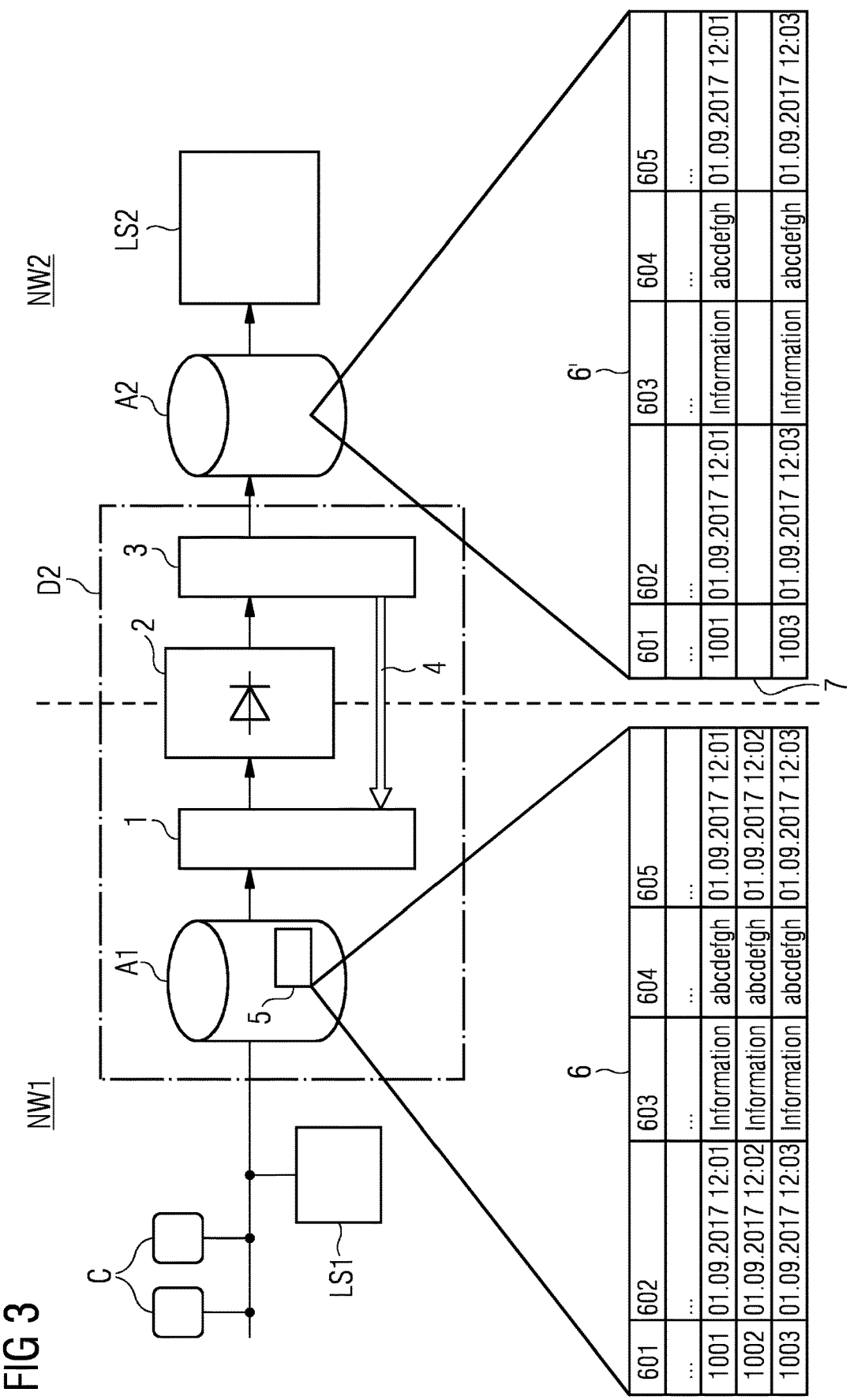
FIG. 3 shows a schematic depiction of an exemplary embodiment of the apparatus according to the invention for reaction-free and integrity-protected synchronization of log data between two separate networks comprising a return channel.

FIG. 3 depicts a further advantageous embodiment of the apparatus. The apparatus D2 is used for reaction-free and integrity-protected synchronization of log data between at least one first network NW1 and a second network NW2, a return channel 4 from the receiving unit 3 to the forwarding unit 1 additionally being shown here. This return channel 4 can be used to initiate a fresh partial or complete transmission of the data. If it is found in the receiving device 3 in the second network NW2 that the transmitted copy of the log data is erroneous, a signal sent via this return channel 4 can be used to initiate a repeat of the synchronization according to the method. To this end, a copy of the log data and the associated metadata are buffered in the first management unit A1 in the first network NW1. This allows simple and efficient assurance that the log data inventory is available in the second network NW2 promptly and completely.

The freedom from reaction of the synchronization method is not threatened by the return channel 4, since just a signal that initiates a repeat transmission of the log data and metadata is transferred. The return channel 4 can for example be configured such that it is used to send only a predetermined signal and to receive the latter in the first network NW1.

Additionally, FIG. 3 shows the data format 6, formed according to embodiments of the invention, in which the information about the log data is stored, in exemplary fashion. These metadata are created in the first management unit A1 in the first network NW1. The time information in the metadata comprises a serial log identification number 601, a first timestamp 62 for the time at which the log data are copied and a second timestamp 605 for the time at which the copied log data are transmitted to the second network, and furthermore origin and completeness information 603 and a checksum 604. This information can be used in the second network to perform the synchronization and the check on the integrity and completeness of the log data.

Every log event sent from a device C to the first log server LS1 receives an explicit, serial log identification number 601. This can be used in the second network NW2 to trace back the chronological order of the log events. Additionally, the log identification number 601 can also be used to check whether the transmitted log data are complete. For example, absent log entries can be detected in the second network NW2 on the basis of gaps in the sequence of log identification numbers 601. This is shown schematically in FIG. 3. The transmitted metadata in the data format 6' formed according to embodiments of the invention, which are stored in the second management unit A2, have a gap 7, i.e. one entry is absent. In such a case, the return channel 4 can be used to initiate a fresh, partial synchronization for this absent data record.

The log data are provided with a first timestamp 602 for the time at which the copy of the log message is created and with a second timestamp 65 for the time at which it is forwarded. These timestamps are independent of the system times of the devices C from which the log data come. In the case of multiple devices C having different system times that all send their log data to the log server LS1, these timestamps, which apply to the network globally, are used to guarantee an explicit association of timings between the log events.

In addition, for example synchronization information for the log data of the last hour, of the last eight hours or of the last 24 hours can be initiated. This allows a consistent, complete log data record to be selected in the second management unit A2 in the second network NW2. If this also fails, a complete re-synchronization can be initiated, i.e. the complete log data record is transmitted from the first network NW1 to the second network NW2.

Furthermore, it is possible for the log data provided by multiple first networks to be put into the correct chronological order on the basis of the respectively associated metadata. This has the advantage that multiple log data provided by separate monitoring apparatuses can also be put into the correct chronological order among one another. A monitoring apparatus can have a time synchronization receiver, e.g. a satellite navigation receiver, such as e.g. for GPS, Galileo, Glonass, Beidou, or another time receiver, such as e.g. DCF77. This allows the timings of log data to be correctly associated, even if the internal nodes in one or more first networks are not synchronized to the same time source. This can be the case e.g. in security-critical control networks operated in isolation.

A central component of the method is the time synchronization of the log data independently of the system time or the time format of a device from which the log data were originally sent or the network time of the respective network. FIG. 4 schematically depicts the synchronization of log data from multiple networks NW1, . . . , NW4. Each network NW1, NW2, NW3, NW4 has its own network time t1, t2, t3, t4. The second network NW2 here is supposed to be the diagnosis network, in which the synchronization for an evaluation of the log data from all the other networks NW1, NW3 and NW4 takes place.

All the other networks NW1, NW3 and NW4 convey copied log data and associated metadata to the second network NW2 in order to be evaluated there e.g. in the correct chronological order. The apparatus according to embodiments of the invention D3, D4 and D5 depicted in exemplary fashion in FIGS. 2 and 3 is represented in each case by an arrow, which is supposed to symbolize the reaction-free transmission.

Each network NW1, NW3 and NW4 can run on a separate network time that does not necessarily need to match the times or time zones of the other networks. In order to analyze the received log data of the different networks NW1, NW3 NW4 in the diagnosis network NW2, they need to be put into the correct chronological order. This is effected by means of the metadata that are produced in each of the networks NW1, NW3, NW4 and forwarded to the diagnosis network NW2. The metadata contain the information needed in order to explicitly associate the log data of a network. This information is explicit for each network. Consequently, a global dependency and association of timings can be inferred in the diagnosis network NW2 on the basis of the metadata of the log data of the different networks NW1, NW3, NW4. Forwarding to the diagnosis network NW2 is effected unidirectionally, i.e. in reaction-free fashion, and without time offset, since the log data are conveyed individually and not in a manner concentrated in a log file. There, the time information in the metadata can also be used to create a combined order for the log events from different networks. Consequently, the log data from different networks can be correlated. The times of the respective networks t1, t3 and t4 are synchronized to the time t2 by the method according to embodiments of the invention, i.e. a dependency between the individual network time t2 and the respective other network times t1, t3 and t4 is determined in the second network NW2. Evaluation and checking of the log data can be performed in their correct order centrally in the diagnosis network NW2.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for reaction-free and integrity-protected synchronization of log data between at least one first network and a second network, wherein:
   log data are monitored and copied in the first network,
   metadata of the log data are formed during the monitoring,
   the copied log data and the associated metadata are temporarily stored in the first network,
   the copied log data and the associated metadata are transmitted from the first network to the second network via a unidirectional coupling unit in reaction-free fashion,
   and
   the copied log data are checked and chronologically organized in the second network on the basis of the metadata,
   wherein the metadata comprise time information, integrity information, origin information, and/or completeness information, and
   wherein the completeness information, integrity information, and/or origin information are checked before the log data is synchronized using the metadata.

2. The method as claimed in claim 1, wherein changes in at least one of the log data and in the associated metadata in comparison with the previously sent log data and metadata are continuously detected in the first network and just the changes are transmitted to the second network.

3. The method as claimed in claim 1, wherein the checked and chronologically organized copy of the log data is temporarily stored in the second network.

4. The method as claimed in claim 1, wherein the checked and chronologically organized copy of the log data is forwarded to a log server for the second network.

5. The method as claimed in claim 1, wherein a cryptographic checksum for at least one of the copied log data and the metadata is created in the first network and is transmitted to the second network with the log data and metadata.

6. The method as claimed in claim 1, wherein the time information in the metadata comprises a serial log identification number and/or a first timestamp for the time at which at least one of the log data are copied and a second timestamp for the time at which the copied log data are transmitted to the second network.

7. The method as claimed in claim 1, wherein the time information in the metadata is formed independently of a system time of a device in the first network.

8. The method as claimed in claim 1, wherein the log data have their timings matched between at least one first network and a second network independently of the specific network times of the individual networks.

9. The method as claimed claim 1, wherein a signal is conveyed to the first network and, on the basis of the signal, the log data and/or the associated metadata are partially or completely transmitted from the first network to the second network again if the at least one of the transmitted log data and metadata in the second network are incomplete.

10. An apparatus for reaction-free and integrity-protected synchronization of log data between at least one first network and a second network, comprising:
   a first management unit that is designed to monitor and copy log data in the at least first network, to form metadata of the log data during the monitoring and to temporarily store the log data and metadata,
   a unidirectional coupling unit that is designed to transmit the copied log data and the associated metadata from the first network to the second network in reaction-free fashion,
   and
   a receiving unit in the second network that is designed to check and associate the timings of the copied log data on the basis of the metadata,
   wherein the metadata comprise time information, integrity information, origin information, and/or completeness information, and
   wherein the completeness information, integrity information, and/or origin information are checked before the log data is synchronized using the metadata.

11. The apparatus as claimed in claim 10, comprising a forwarding unit in the first network that is designed to continuously detect changes in at least one of the log data and in the associated metadata in comparison with the previously sent log data and metadata and to transmit just the changes to the second network.

12. The apparatus as claimed in claim 10, comprising a second management unit in the second network that is designed to temporarily store the copied log data.

13. The apparatus as claimed in claim 10, comprising at least one return channel from the receiving unit in the second network to the forwarding unit in the first network that is designed to convey a signal to the first network, wherein, on the basis of the signal, the log data and/or the associated metadata are partially or completely transmitted from the first network to the second network again if at least one of the transmitted log data and metadata in the second network are incomplete.

14. A computer program product comprising a non-transitory computer readable hardware storage device storing a computer readable program code, the computer readable program code comprising an algorithm that when executed by a computer processor of a computing system implements a method, the method comprising:

monitoring log data and copying the monitored log data in the first network, forming metadata of the log data during the monitoring, temporarily storing the copied log data and the associated metadata in the first network, transmitting the copied log data and the associated metadata from the first network to the second network via a unidirectional coupling unit in reaction-free fashion, and checking the copied log data and chronologically organizing the checked log data in the second network on the basis of the metadata, wherein the metadata comprise time information, integrity information, origin information, and/or completeness information, and wherein the completeness information, integrity information, and/or origin information are checked before the log data is synchronized using the metadata.

* * * * *